UNITED STATES PATENT OFFICE.

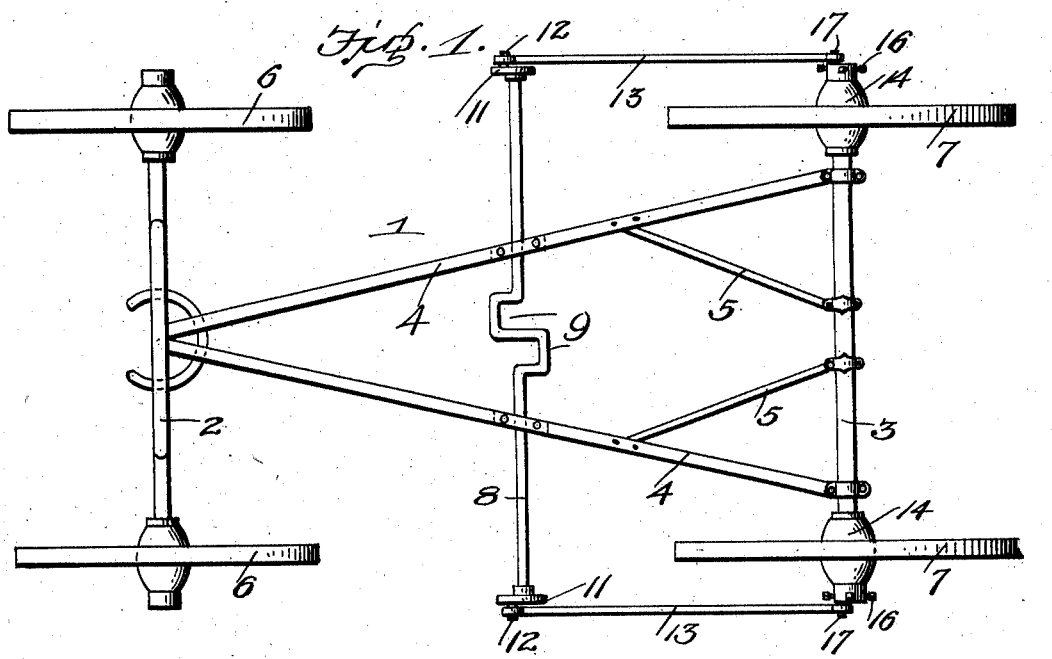
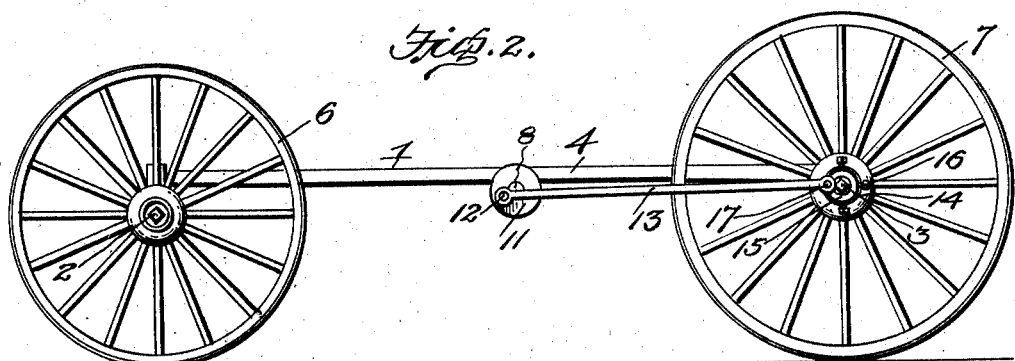
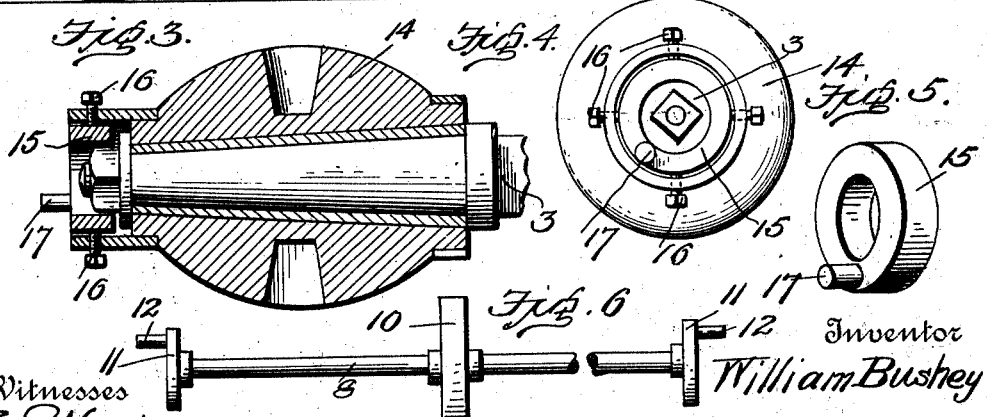

WILLIAM BUSHEY, OF VINCENNES, INDIANA.

DRIVING-GEAR FOR MOTOR-VEHICLES.

967,722.

Specification of Letters Patent. Patented Aug. 16, 1910.

Application filed September 23, 1909. Serial No. 519,173.

*To all whom it may concern:*

Be it known that I, WILLIAM BUSHEY, a citizen of the United States, residing at Vincennes, in the county of Knox and State of Indiana, have invented certain new and useful Improvements in Driving-Gears for Motor-Vehicles; and I do declare the following to be a full, clear, and exact description of the invention, such as will enable others skilled in the art to which it appertains to make and use the same.

This invention relates to improvements in driving gear for motor vehicles.

The object of the invention is to provide a simple and inexpensive driving gear whereby a motor may be connected to an ordinary vehicle wheel for driving the same and thereby propelling the vehicle.

With this and other objects in view, the invention consists of certain novel features of construction, combination and arrangement of parts, as will be more fully described and particularly pointed out in the appended claim.

In the accompanying drawings, Figure 1 is a plan view of the running gear of a vehicle showing the application of the invention thereto; Fig. 2 is a side view of the same; Fig. 3 is an enlarged sectional view of the hub of one of the vehicle wheels showing the manner in which the driving gear is secured thereto; Fig. 4 is an end view of the same; Fig. 5 is a detail perspective view of the hub engaging collars; Fig. 6 is a detail side view of a modified form of driving shaft.

Referring more particularly to the drawings, 1 represents the running gear of a vehicle, said gear may be of any suitable construction and is here shown as consisting of front and rear axles 2 and 3, said axles being connected together by the usual reach 4, to which the rear axle is further connected by brace bars 5. On the front axle are arranged supporting wheels 6 and on the rear axle are arranged supporting and driving wheels 7.

Revolubly mounted in suitable bearings on the reach 4 of the gear is a drive shaft 8, which may be connected for operation in any suitable manner to a motor arranged in the vehicle. The motor forms no part of the present invention, and is therefore not shown in the drawings. In the first figures of the drawings, the shaft 8 is shown as being provided with suitably arranged cranks 9. It will be obvious, however, that the shaft 8 may be provided with other forms of motor connection, such, for instance, as a sprocket-gear or a pulley 10, as shown in Fig. 6 of the drawings.

On the opposite ends of the shaft 8 are fixedly mounted crank disks 11, having arranged on their outer sides eccentric wrist pins 12, to which are connected pitman rods 13, which extend back to the rear driving and supporting wheels 7 of the vehicle. The rear ends of the pitman rods 13 are operatively connected to the hubs 14 of the rear driving and supporting wheels by means of collars 15, which are inserted in the end of the hubs and secured to the same by a series of set screws 16 arranged in the sand bands of the hubs and screwed into engagement with the sides of the collars, as clearly shown in Figs. 3 and 4 of the drawings. The collars 15 are provided with laterally projecting eccentrically arranged wrist pins 17 to which the rear ends of the pitman rods 13 are connected.

A driving gear constructed as herein described may be applied to and operatively connected with the running gear of an ordinary vehicle without altering any of the parts of the same.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim:

I claim as my invention:

A driving mechanism for vehicles comprising a suitably operated drive shaft revolubly mounted on the running gear of the vehicle, crank disks arranged on the opposite ends of said shaft, wrist pins eccentrically secured to said disk, pitman rods connected at their forward ends to said wrist pins, sand bands on the ends of the hubs of the rear wheels, collars arranged in said sand bands, set screws passing through the sand bands at intervals to removably and adjustably secure said collars to the sand bands, and wrist pins projecting laterally from said collars and engaged by the rear ends of said pitman rods, whereby the movement of said
5 drive shaft is transmitted to the rear wheels of the vehicle to propel the latter.

In testimony whereof I have hereunto set my hand in presence of two subscribing witnesses.

WILLIAM BUSHEY.

Witnesses:
E. H. L. WOLF,
JOHN T. BROKHAGE.